United States Patent
Duan et al.

(10) Patent No.: US 9,763,105 B2
(45) Date of Patent: Sep. 12, 2017

(54) DETERMINING COVERAGE HOLE OF COMMUNICATION NETWORK ALONG ROAD

(71) Applicant: INTERNATIONAL BUSINESS MACHINES CORPORATION, Armonk, NY (US)

(72) Inventors: Ning Duan, Beijing (CN); Li Li, Beijing (CN); Jie Song, Beijing (CN); Chunhua Tian, Beijing (CN); Ji Zheng Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 60 days.

(21) Appl. No.: 14/864,119

(22) Filed: Sep. 24, 2015

(65) Prior Publication Data

US 2016/0095000 A1    Mar. 31, 2016

(30) Foreign Application Priority Data

Sep. 28, 2014    (CN) .......................... 2014 1 0510358

(51) Int. Cl.
| | | |
|---|---|---|
| *H04W 36/00* | (2009.01) | |
| *H04W 40/00* | (2009.01) | |
| *H04W 72/00* | (2009.01) | |
| *H04W 16/18* | (2009.01) | |
| *H04W 4/02* | (2009.01) | |
| *H04W 64/00* | (2009.01) | |
| *H04W 24/02* | (2009.01) | |

(52) U.S. Cl.
CPC ........... *H04W 16/18* (2013.01); *H04W 4/027* (2013.01); *H04W 4/028* (2013.01); *H04W 64/006* (2013.01); *H04W 24/02* (2013.01); *H04W 36/00* (2013.01)

(58) Field of Classification Search
None
See application file for complete search history.

(56) References Cited

U.S. PATENT DOCUMENTS

| | | | |
|---|---|---|---|
| 7,113,793 | B2 | 9/2006 | Dronamraju et al. |
| 7,499,718 | B2 | 3/2009 | Douglas et al. |

(Continued)

FOREIGN PATENT DOCUMENTS

EP    2437537 A1    4/2012

OTHER PUBLICATIONS

Cell Coverage Hole Detection, Dead Zones, Feb. 8, 2010.

*Primary Examiner* — Moustapha Diaby
(74) *Attorney, Agent, or Firm* — Alexa Ashworth (57) ABSTRACT

Method and apparatus for determining a coverage hole of a communication network along a road. The method includes: retrieving typical speed information on the basis of connection history that at least one first mobile device moves along the road; in response to detecting a connection drop when at least one second mobile device moves along the road, estimating a drop position of the at least one second mobile device on the basis of attribute information of the at least one second mobile device and the typical speed information; and determining the coverage hole on the basis of the drop position of the at least one second mobile device. In one embodiment of the present invention, there is provided a corresponding apparatus.

18 Claims, 8 Drawing Sheets

(56) References Cited

U.S. PATENT DOCUMENTS

| | | | |
|---|---|---|---|
| 2012/0127876 A1* | 5/2012 | Hunukumbure | H04W 24/00 370/252 |
| 2014/0011484 A1* | 1/2014 | Yen | G08G 1/0133 455/414.1 |
| 2014/0067257 A1 | 3/2014 | Dave et al. | |
| 2014/0179279 A1 | 6/2014 | LaMarca et al. | |
| 2014/0315577 A1* | 10/2014 | Yokoyama | H04W 24/04 455/456.1 |
| 2016/0021697 A1* | 1/2016 | Vargantwar | H04W 76/028 370/329 |

* cited by examiner

DETERMINING COVERAGE HOLE OF COMMUNICATION NETWORK ALONG ROAD

CROSS-REFERENCE TO RELATED APPLICATION

This application claims the benefit of priority to Chinese Patent Application No. 20140510358.9, filed Sep. 28, 2014, the contents of which are incorporated herein by reference.

BACKGROUND

The present invention relates to a method and apparatus for determining a coverage hole of a communication network along a road in the field of mobile communication.

With the development of mobile communication technology, mobile communication networks have covered more areas. For example, in a densely-populated city, operators of mobile communication networks usually deploy base station equipment in a uniform fashion; in a sparsely-populated region, however, operators only deploy base station equipment in areas having a relatively high population concentration (e.g., the countryside, etc.) or on both sides of roads connecting population centers.

While deploying base station equipment, various factors have been taken into consideration. During the practical operation of base station equipment, however, it might be found that the communication signal quality in some areas is quite poor and that phenomena like linkage interruption might occur. In the context of the present invention, an area which the base stations cannot cover during the practical operation is referred to as coverage hole.

A variety of technical solutions for measuring the coverage hole have been proposed so far. However, these technical solutions are only applicable to determine the coverage hole in areas like cities, but are not applicable to determine the coverage hole of a communication network along roads. Roads can include various types, for example, ordinary roads and highways. When a user on a vehicle moving fast on a highway makes a call, it is hard to determine the accurate position of a dropped call, let alone determine the coverage hole along the highway since the vehicle is running at high speed (e.g., as fast as 100 km/hour), Therefore, it is a problem regarding how to determine the coverage hole along a road on the basis of concrete environment of base stations deployed along the road.

SUMMARY

It is desired to develop a technical solution capable of conveniently and efficiently determining a coverage hole of a communication network along a road, and it is desired that the technical solution can seek the coverage hole along the road by taking into consideration the historical connection quality of users when moving along the road. Furthermore, it is desired that the technical solution is compatible with an existing mobile communication network and can determine the coverage hole along the road without a need to additionally deploy dedicated measurement devices.

One aspect of the present invention, provides a method for determining a coverage hole of a communication network along a road, including: retrieving typical speed information on the basis of connection history of at least one first mobile device when the at least one first mobile device moves along the road; estimating, in response to detecting a connection drop of at least one second mobile device when the at least one second mobile device moves along the road, a drop position of the at least one second mobile device on the basis of attribute information of the at least one second mobile device and the typical speed information; and determining the coverage hole on the basis of the drop position of the at least one second mobile device.

One aspect of the present invention, provides an apparatus for determining a coverage hole of a communication network along a road, including: a retrieving module configured to retrieve typical speed information on the basis of connection history of at least one first mobile device when the at least one first mobile device moves along the road; an estimating module configured to estimate, in response to detecting a connection drop of at least one second mobile device when the at least one second mobile device moves along the road, a drop position of the at least one second mobile device on the basis of attribute information of the at least one second mobile device and the typical speed information; and a determining module configured to determine the coverage hole on the basis of the drop position of the at least one second mobile device.

By means of the method and apparatus of the present invention, the accurate scope of the coverage hole along the road, especially a highway can be determined conveniently and efficiently without using dedicated measurement devices.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present invention.

DETAILED DESCRIPTION

Some preferable embodiments will be described in more detail with reference to the accompanying drawings, in which the preferable embodiments of the present invention have been illustrated. However, the present invention can be implemented in various manners, and thus should not be construed to be limited to the embodiments disclosed herein. On the contrary, those embodiments are provided for the thorough and complete understanding of the present invention, and completely conveying the scope of the present invention to those skilled in the art.

Figure 1:
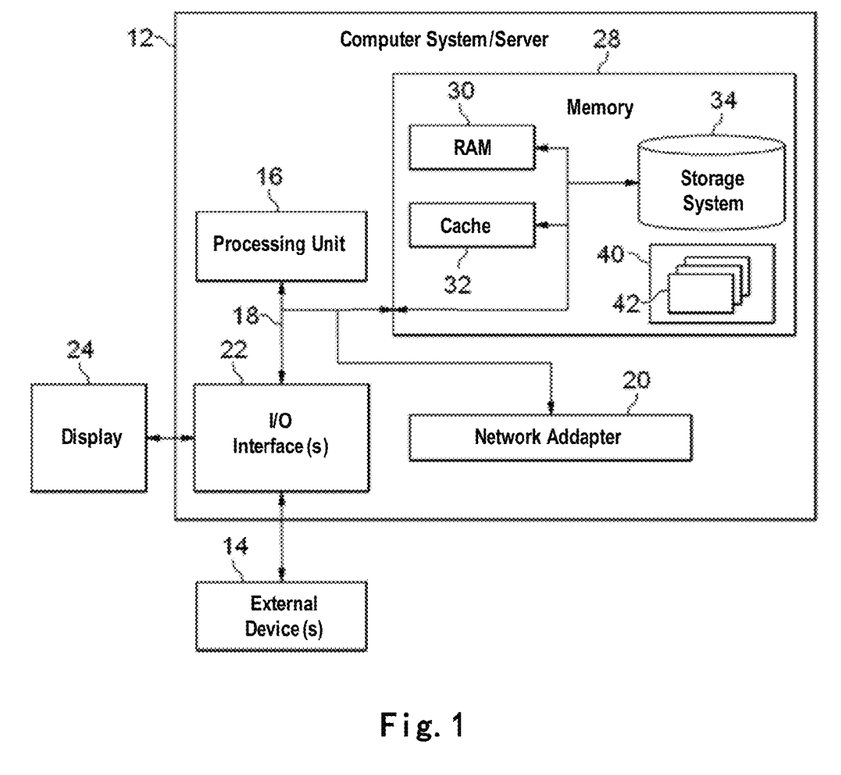
FIG. 1 schematically shows an exemplary computer system/server 12 which is applicable to implement the embodiments of the present invention.

Referring to FIG. 1, an exemplary computer system/ server 12 which is applicable to implement the embodiments of the present invention is shown. Computer system/server 12 is only illustrative and is not intended to suggest any limitation as to the scope of use or functionality of embodiments of the invention described herein.

Referring to FIG. 1, computer system/server 12 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media. Although not shown, a magnetic disk drive for reading from and writing to a removable, non-volatile magnetic disk, for example a "floppy disk", and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having at least one set of program modules that are configured to carry out the functions of embodiments of the invention.

Program/utility 40, having at least one set of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing units, external disk drive arrays, RAID systems, tape drives, and data archival storage systems, etc.

Figure 2:
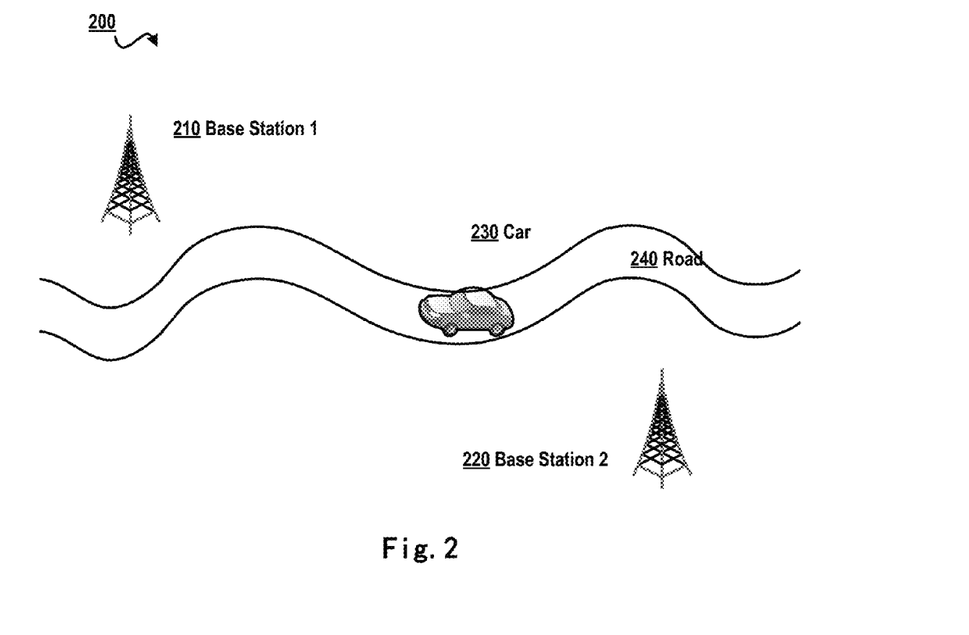
FIG. 2 schematically shows a block diagram of a method for determining a coverage hole of a communication network along a road according to one technical solution.

FIG. 2 schematically shows a block diagram 200 of a method for determining a coverage hole of a communication network along a road according to one technical solution. As shown in this figure, a base station 1 210 and a base station 2 220 are deployed along a road 240. According to the existing technical solution for determining a coverage hole along road 240, the operator of a mobile communication network periodically sends out a car 230 to run along a to-be-tested road, which car 230 can use a dedicated device to measure the communication signal quality along road 240. Subsequently, the operator will adjust parameters, such as power and orientation of antennas, in various base stations (e.g., base station 1 210 and base station 2 220) along the road.

Although the technical solution as shown in FIG. 2 helps to find the coverage hole along the road, the technical solution still has several problems. On the one hand, the car has to be equipped with expensive dedicated measurement devices and must run along each to-be-measured road and collect data. Usually one car can only test a limited length of roads every day, and such tests will cause huge overheads of manpower and material resources as well as time. On the other hand, when seeking the coverage hole along a given road, the car can run in one direction on the road and collect data only once. However, huge errors might occur in data collected in one measurement. For test overheads consideration, it is impossible to make multiple measurements on the same road. As a result, the measurement result might be inaccurate; further, if the base station configuration is adjusted on the basis of this inaccurate measurement result, then it is highly likely that the adjusted base station still cannot cover areas along the road, i.e., there still exists the coverage hole of the communication network.

There is an overlapping area between coverage areas of two base stations; a mobile device needs to hand over when entering from the coverage area of one base station to the coverage area of the other one. Although signals from the two base stations still can be received in this overlapping area, the mobile device might drop because signals from the two base stations are rather weak. However, the overlapping area of the coverage areas of the two base stations usually covers a wide scope, so the existing technical solution fails to accurately position the coverage hole in the overlapping area. Therefore, it becomes a challenge regarding how to determine the coverage hole in the large overlapping area as accurately as possible.

In view of the above drawbacks in the prior art, various embodiments of the present invention propose a method for determining a coverage hole of a communication network along a road on the basis of connection history of a mobile device that once moves along the road. However, the connection history of the mobile device only records timestamps of connection drops but does not include the position information of connection drops. In the embodiments of the present invention, the position of a drop can be determined on the basis of speed information that the mobile device moves along the road and of time information that the mobile device moves along the road before the drop. In the embodiments of the present invention, the coverage hole can be determined on the basis of a drop position when the mobile device moves along the road.

Since there might exist a considerable difference in speed at which different vehicles move along the road, speed limit information of the road or speed information of a given vehicle cannot be taken as the speed at which the mobile device moves along the road, but various factors need to be considered and the typical speed at which the mobile device moves along the road needs to be calculated.

Specifically, in one embodiment of the present invention, there is a proposed method for determining a coverage hole of a communication network along a road, including: obtaining typical speed information on the basis of connection history of at least one first mobile device when the at least one first mobile device moves along the road; estimating, in response to detecting a connection drop of at least one second mobile device when the at least one second mobile device moves along the road, a connection drop position of the at least one second mobile device on the basis of attribute information of the at least one second mobile device and the typical speed information; and determining the coverage hole on the basis of the connection drop position of the at least one second mobile device. In the context of the present invention, roads can include, without limitation to, ordinary roads and highways.

Figure 3:
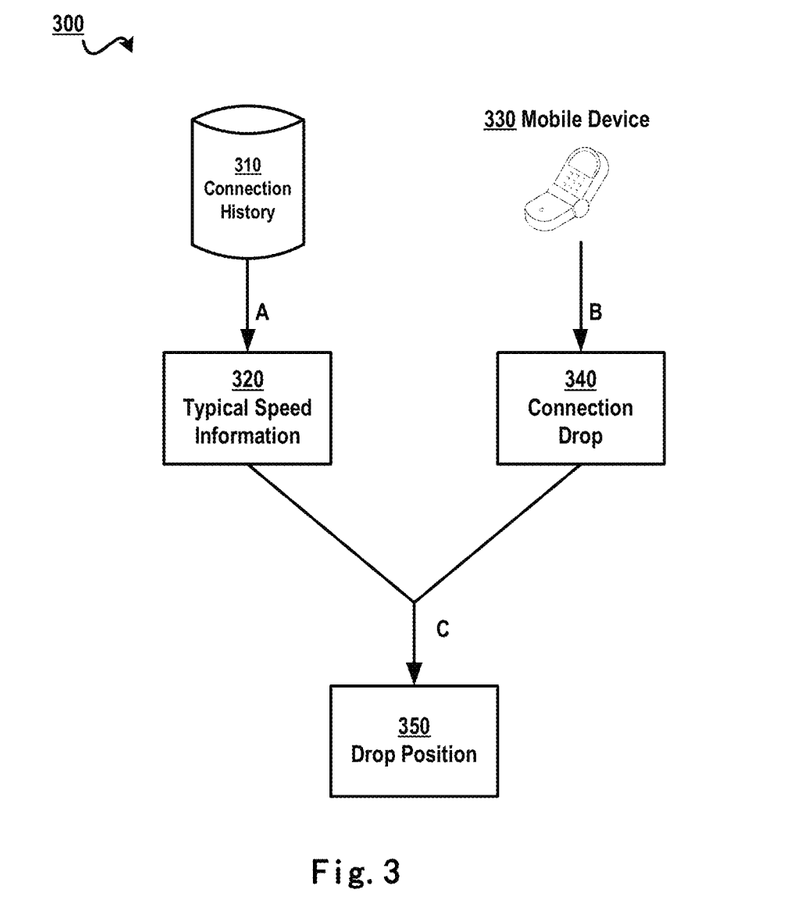
FIG. 3 schematically shows a block diagram of a technical solution for determining a coverage hole of a communication network along a road according to one embodiment of the present invention.

FIG. 3 schematically shows a block diagram 300 of a technical solution for determining a coverage hole of a communication network along a road according to one embodiment of the present invention. As connection history 310 stores connection history of the at least one first mobile device when it moves along the road, handover information of the at least one first mobile device between a plurality of base stations while the at least one first mobile device moves along the road can be extracted from the connection history, and further typical speed information that a plurality of first mobile devices move along the road can be calculated, as shown by an arrow 1. In one embodiment of the present invention, speed information on a plurality of different first mobile devices can be calculated, and typical speed information can be obtained on the basis of the calculated speed information.

A mobile device 330 shown in FIG. 3 is a mobile device that is moving along the road and making a connection. When it is detected that a connection drop occurs in mobile device 330, as shown by an arrow B, a drop position 350 of mobile device 330 can be estimated on the basis of typical speed information 320, as shown by an arrow C. Note although FIG. 3 only shows one mobile device 330, in the embodiments of the present invention, drop positions of a plurality of mobile devices can further be calculated.

Figure 4:
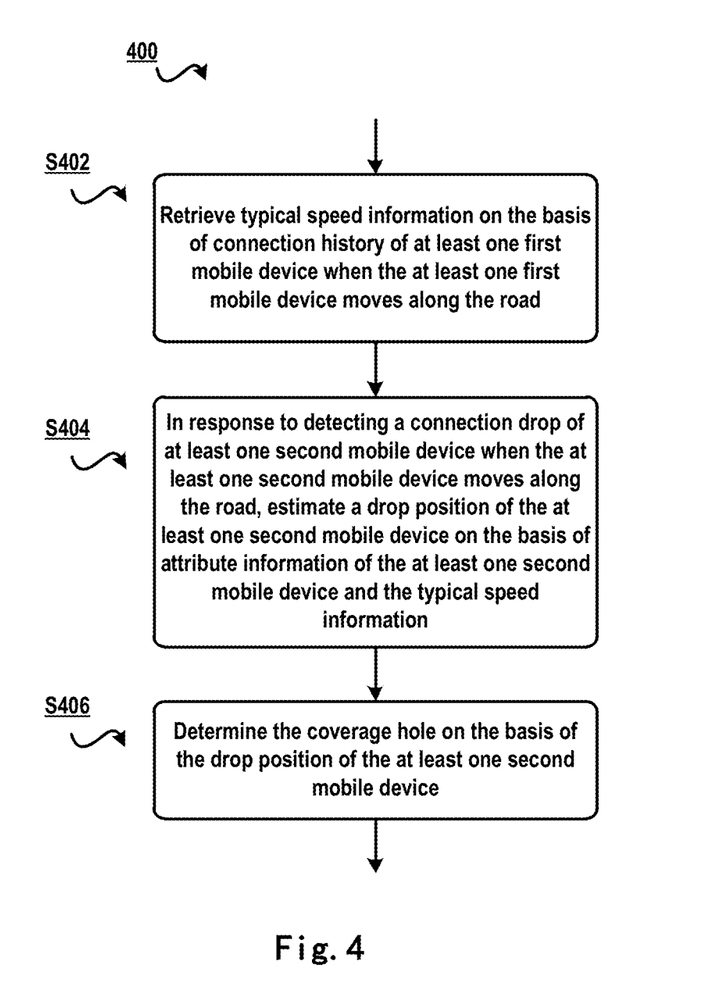
FIG. 4 schematically shows a flowchart of a method for determining a coverage hole of a communication network along a road according to one embodiment of the present invention.

With reference to FIG. 4 to FIG. 8, detailed description is presented below to the principle of the embodiments of the present invention. Specifically, FIG. 4 schematically shows a flowchart 400 of a method for determining a coverage hole of a communication network along a road according to one embodiment of the present invention. In step S402, typical speed information is obtained on the basis of connection history of at least one first mobile device when the at least one first mobile device moves along the road. In this embodiment, calculation can be conducted with respect to each first mobile device of the at least one first mobile device, and the final typical speed information can be determined on the basis of multiple pieces of resulting speed information. For example, an averaging method can be adopted.

In various embodiments of the present invention, the typical speed information can describe speed at each position on the road while the mobile device moves along the road. Those skilled in the art can design various data structures to store the typical speed information, for example, use a data structure as shown in Table 1 below.

TABLE 1

| Typical Speed Information | | |
| --- | --- | --- |
| No. | Position | Speed (m/s) |
| 1 | P1 | 10 |
| 2 | P2 | 11 |
| ... | ... | ... |

As shown in Table 1, the moving speed of the mobile device at the position P1 is 10 m/s and the moving speed at the position P2 is 11 m/s. Usually the moving speed of a mobile device is the travelling speed of a vehicle that carries the mobile device, and speeds of vehicles that travel on the same road segment are similar. Therefore, the typical speed information as shown in Table 1 can serve as the representative speed of various mobile devices that move along the road, so that later the location of a drop of other mobile device that moves along the road can be estimated on the basis of the representative speed.

In step S404, in response to detecting a connection drop of at least one second mobile device when the at least one second mobile device moves along the road, a connection drop position of the at least one second mobile device is estimated on the basis of attribute information of the at least one second mobile device and the typical speed information. Note the embodiments of the present invention do not limit concrete content of the connection, and the connection can be a call connection and/or a data connection. In the embodiments of the present invention, since time when the second mobile device moves along the road before a connection drop can be learned on the basis of attribute information of the second mobile device, the drop position can be estimated according to the time and the typical speed information.

In step S406, the coverage hole is determined on the basis of the drop position of the at least one second mobile device. An area with the most intensive drop positions can be selected as the coverage hole, for example, an area including 80% of drop positions can be taken as the coverage hole. Alternatively, an existing technical solution for determining other position of the coverage hole can be combined with the technical solution of the present invention. For example, an overlapping portion between an area of the coverage hole obtained on the basis of the existing technical solution and the area obtained according to the technical solution of the present invention can be taken as the coverage hole of the communication network.

In one embodiment of the present invention, the retrieving typical speed information on the basis of connection history of the at least one first mobile device when the at least one first mobile device moves along the road includes: with respect to each first mobile device of the at least one first mobile device, detecting from the connection history a plurality of handovers made by the each first mobile device between a plurality of base stations along the road; and calculating historical speed information when the each first mobile device makes the plurality of handovers; and retrieving the typical speed information on the basis of the historical speed information.

The mobile communication network can record various respects of information of a mobile device in one connection, for example, can record information on handovers made by the mobile device between a plurality of base stations during the connection. Since the handover information can include handover time, and path length that the mobile device moves between handover points of the plurality of handovers can be determined, historical speed information when the each first mobile device makes the plurality of handovers can be calculated further.

Subsequently, where the historical speed information of the each first mobile device has been obtained, the typical speed information can be calculated on the basis of the historical speed information of the each first mobile device. For example, an average value of the historical speed information of the each first mobile device can be used as the typical speed information.

In one embodiment of the present invention, the calculating, on the basis of the plurality of handovers, the historical speed information when the each first mobile device makes the plurality of handovers includes: calculating historical speed information during the plurality of handovers on the basis of handover times and handover positions of two successive handovers among the plurality of handovers.

Since moving speeds of the first mobile device on different road segments of the road can vary, the road can be divided into different segments. Thereby, the moving speed on each segment of the road can be calculated relatively accurately.

In one embodiment of the present invention, the calculating historical speed information during the plurality of handovers on the basis of handover times and handover positions of two successive handovers among the plurality of handovers includes: with respect to a handover $Switch_i$ among two successive handovers, obtaining a handover position $Pos_i$ and a handover time $Time_i$; and calculating a speed $$Vol_i = \frac{Pos_{i+1} - Pos_i}{Time_{i+1} - Time_i}$$

of the each first mobile device on the handover $Switch_i$.

When the mobile device moves along the road, a time and position of each handover can be obtained one after another, and further a corresponding moving speed can be calculated on the basis of path length of movement between two successive handovers and a time difference between the two successive handovers. Hereinafter, illustration is presented to how to calculate a moving speed by means of an example. For example, the handover time of the mobile device on the first handover is 13:00:00 and the handover position is P1; the handover time on the second handover is 13:03:00 and the handover position is P2. If path length between the handover positions P1 and P2 is 3000 meters, then the speed at which the mobile device moves on the path between P1 and P2 is:

$$Vol_1 = \frac{P_2 - P_1}{Time_2 - Time_1} = \frac{3000(m)}{3*60(s)} = 16.67 \text{ m/s}$$

Note the path length between P1 and P2 refers to length of the path which the mobile device has taken when moving along the road, rather than a distance between P1 and P2. On the basis of the above-described principle, those skilled in the art can determine the speed at other handover positions. Where the speed at each handover position has been determined, the typical speed information can be generated on the basis of speeds at various handover positions. Those skilled in the art can use various approaches to describing the typical speed information, for example, the list as shown in Table 1 above.

In one embodiment of the present invention, it is possible to obtain, from connection history of at least one second mobile device, a handover time and a handover position of each handover before the second mobile device drops the call. Some error might occur in the handover position obtained as such, for example, is not on the road. Therefore, in one embodiment of the present invention, the handover position can be estimated in a manner below. In one embodiment of the present invention, the handover position $Pos_i$ is obtained on the basis of positions of two base stations associated with the handover $Switch_i$ and geographical information of the road.

Generally, when the mobile device enters the overlapping area between coverage areas of two base stations, signal strengths which the mobile device can receive from the two base stations are similar. Therefore, a position of the overlapping area can be calculated on the basis of positions of the two base stations and geographical information of the road, and further the handover position can be obtained.

Figure 5:
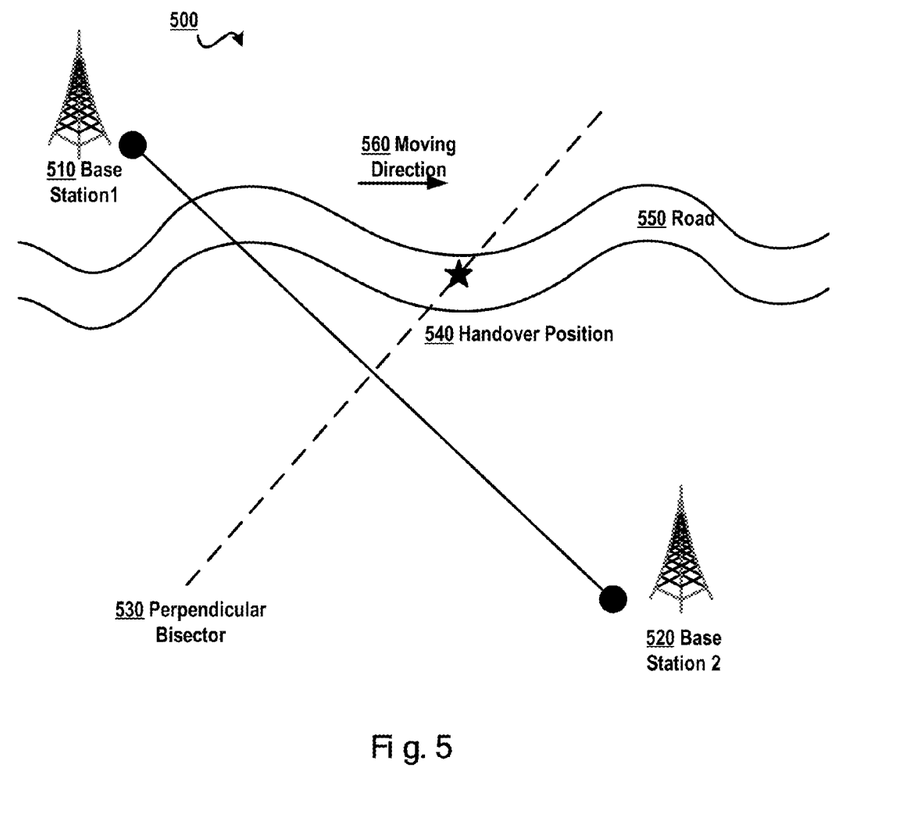
FIG. 5 schematically shows a diagram for determining a handover position where the mobile device makes a handover between two base stations according to one embodiment of the present invention.

In one embodiment of the present invention, the handover position $Pos_i$ is an intersection of the road with a perpendicular bisector of a connecting line between the two base stations. When the mobile device enters the overlapping area, signals received by the mobile device from a target base station get stronger as the mobile device approaches the target base station, so the handover usually takes place at the central position of coverage areas of the two base stations. FIG. 5 schematically shows a diagram 500 for determining a handover position of a handover made by the mobile device between two base stations according to one embodiment of the present invention. As shown in FIG. 5, a base station 1 510 and a base station 2 520 are two base stations along a road 550. When the mobile device moves along road 550, for example in a left-to-right movement direction 560, the mobile device will hand over from base station 1 510 to base station 2 520, and a handover position 540 is at an intersection, shown as a star, of road 550 with a perpendicular bisector 530 of a connecting line between base station 1 510 and base station 2 520.

In one embodiment of the present invention, the retrieving typical speed information on the basis of connection history of the at least one first mobile device when the at least one first mobile device moves along the road includes: retrieving typical speed information of the at least one first mobile device in a plurality of environmental states, the plurality of environmental states including at least one of: date, time, holiday, and meteorological state.

Since a vehicle's speeds in different environmental states vary, the typical speed information in different environmental states can further be obtained. For example, environmental states can be clustered on the basis of at least one of date, time, holiday and meteorological state. For example, typical speed information under environmental states like <night, stormy> and <daytime, sunny> can be obtained.

Figure 6:
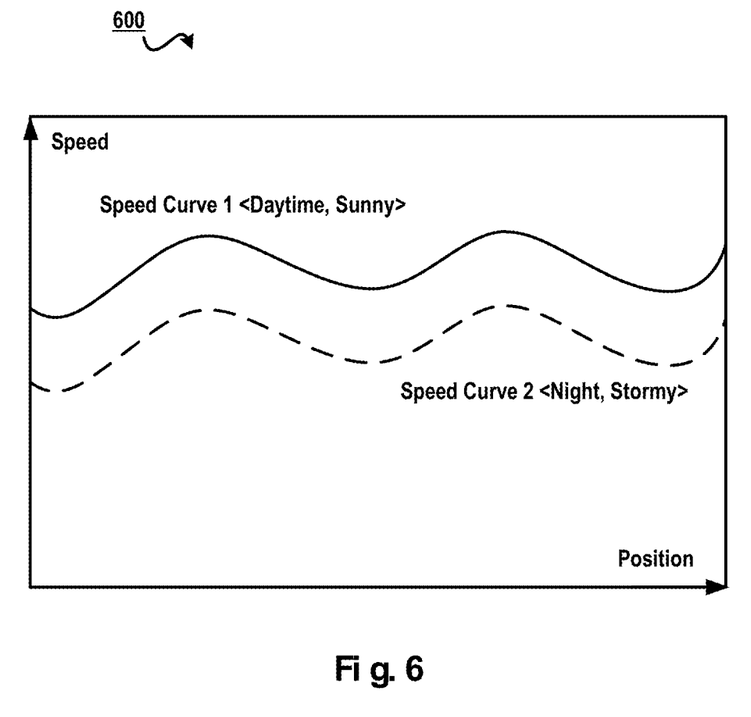
FIG. 6 schematically shows a diagram of typical speed information according to one embodiment of the present invention.

FIG. 6 schematically shows a diagram 600 of typical speed information according to one embodiment of the present invention. Specifically, the horizontal axis of a speed curve represents positions and the vertical axis represents speeds. A speed curve 1 shows a speed curve under a <daytime, sunny> environmental state, and a speed curve 2 shows a speed curve under a <night, stormy> environmental state. Those skilled in the art can further obtain a speed curve under other typical environmental state on the road. In this manner, when determining a drop location of the second mobile device, the drop location of the second mobile device can be determined more accurately on the basis of the typical speed information under a corresponding environmental state.

In one embodiment of the present invention, the estimating, in response to detecting a connection drop of the at least one second mobile device when the at least one second mobile device moves along the road, the drop position of the at least one second mobile device on the basis of attribute information of the at least one second mobile device and the typical speed information further including: measuring a current environmental state of the at least one second mobile device; and estimating a drop location of the at least one second mobile device on the basis of the typical speed information corresponding to the current environmental state.

Since environmental states that confront each of the at least one second mobile device when moving along the road can vary, a speed that is most suitable for the current environmental state can be selected from the typical speed information under multiple environmental states, so as to estimate the drop location more accurately. Specifically, for example, the current environmental state is (time: 10:00 PM, weather: stormy), then speed curve can be selected from the example as shown in FIG. 6, and subsequent processing is implemented on the basis of this speed curve.

In one embodiment of the present invention, the estimating, in response to detecting the connection drop of the at least one second mobile device when the at least one second mobile device moves along the road, the drop position of the at least one second mobile device on the basis of attribute information of the at least one second mobile device and the typical speed information including: with respect to each second mobile device of the at least one second mobile device, obtaining, from connection history of the each second mobile device, a drop time $Time_{drop}$ of a connection, a handover time of the latest handover between the plurality of base stations before the drop as well as a handover position Pos of the latest handover; looking up a speed Vo1 corresponding to the handover position Pos in the typical speed information; and calculating a drop position $Pos_{drop}$ of the each second mobile device: $Pos_{drop} = Pos + Vo1 * (Time_{drop} - Time)$.

In this embodiment, before the second mobile device drops a connection, the second mobile device is normally connected to the mobile network and handovers between the plurality of base stations when moving along the road. Therefore, a handover time and a handover position Pos of the last handover before the second mobile device drops the connection can be determined according to the above method.

Figure 7:
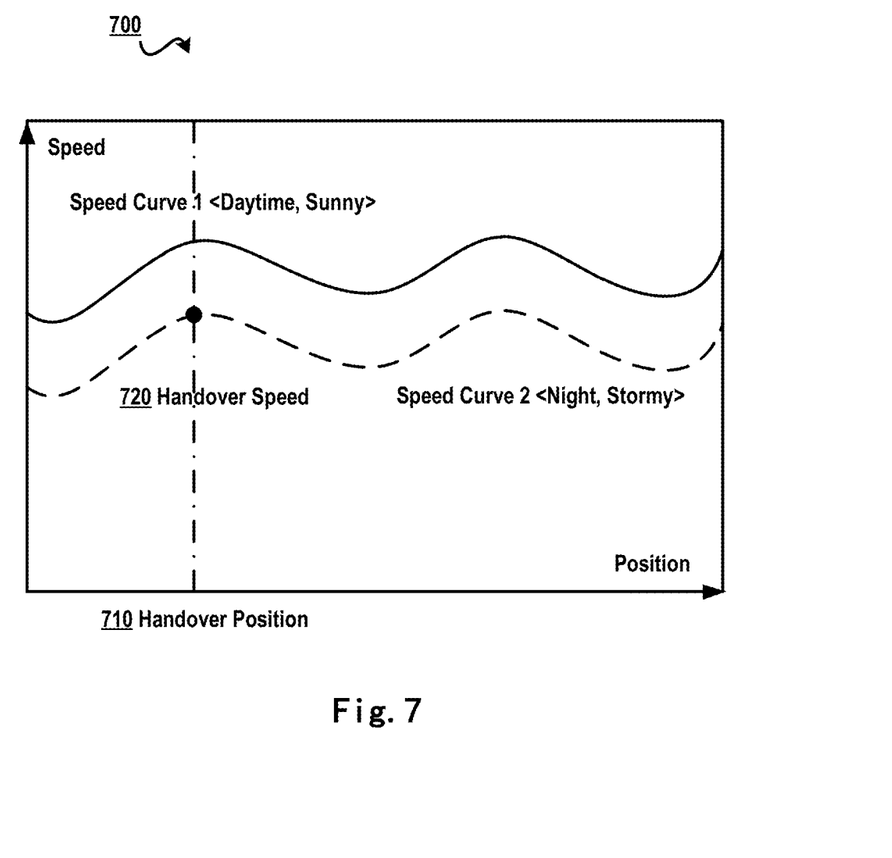
FIG. 7 schematically shows a diagram of speeds when the mobile device makes a handover between two base stations according to one embodiment of the present invention.

FIG. 7 schematically shows a diagram 700 for determining a speed when the mobile device handovers between two base stations according to one embodiment of the present invention. Suppose a handover position 710 of the latest handover of the second mobile device has been determined, then a handover speed 720 corresponding to handover position 710 can be found in speed curves shown in FIG. 7. After the latest handover, the second mobile device moves at the speed Vo1 (i.e., speed 720 as shown in FIG. 7) corresponding to the handover position Pos (i.e., handover position 710 as shown in FIG. 7) until it drops the connection, so the path length which the second mobile device has followed after the latest handover is $Vo1*(Time_{drop} - Time)$. By adding the path length to the handover position Pos of the latest handover, the drop position of the second mobile device is then learned, specifically, the drop position $Pos_{drop}$ is $Pos_{drop} = Pos + Vo1 * (Time_{drop} - Time)$.

In one embodiment of the present invention, the drop position can be calculated with respect to each dropping second mobile device, and then the coverage hole of the mobile network can be determined on the basis of the drop position.

In one embodiment of the present invention, there is further including: respectively executing the method with respect to the at least one first mobile device that moves in different directions of the road. Those skilled in the art should understand that the road is usually two-way, so the method of the present invention can be executed with respect to both directions of the road that the vehicle is allowed to run. An advantage of executing the technical solution of the present invention in both directions is to more accurately determine the coverage hole in different directions of the base station so as to more precisely adjust the orientation and power of antennas in the base station.

Various embodiments implementing the method of the present invention have been described above with reference to the accompanying drawings. Those skilled in the art can understand that the method can be implemented in software, hardware or a combination of software and hardware. Moreover, those skilled in the art can understand by implementing steps in the above method in software, hardware or a combination of software and hardware, there can be provided an apparatus based on the same invention concept. Even if the apparatus has the same hardware structure as a general-purpose processing device, the functionality of software contained therein makes the apparatus manifest distinguishing properties from the general-purpose processing device, thereby forming an apparatus of the various embodiments of the present invention. The apparatus described in the present invention including several means or modules, the means or modules configured to execute corresponding steps. Upon reading this specification, those skilled in the art can understand how to write a program for implementing actions performed by these means or modules. Since the apparatus is based on the same invention concept as the method, the same or corresponding implementation details are also applicable to means or modules corresponding to the method. As detailed and complete description has been presented above, the apparatus is not detailed below.

Figure 8:
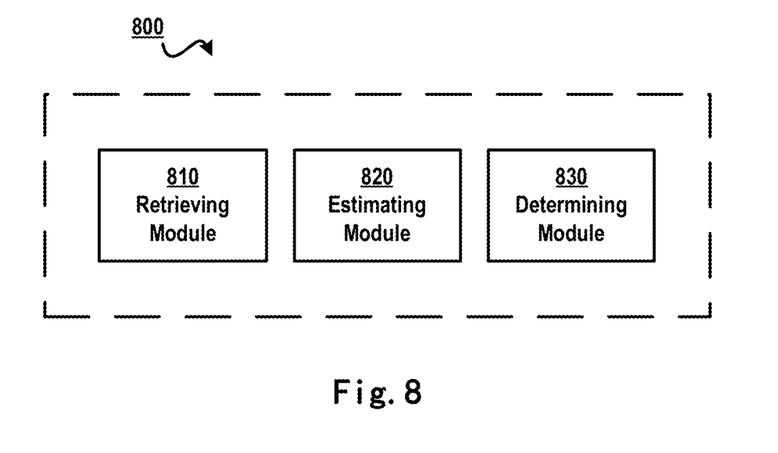
FIG. 8 schematically shows a block diagram of an apparatus for determining a coverage hole of a communication network along a road according to one embodiment of the present invention.

FIG. 8 schematically depicts a block diagram 800 of an apparatus for determining a coverage hole of a communication network along a road according to one embodiment of the present invention. Specifically, there is provided an apparatus for determining a coverage hole of a communication network along a road, including: a retrieving module 810 configured to retrieve typical speed information on the basis of connection history of at least one first mobile device when the at least one first mobile device moves along the road; an estimating module 820 configured to estimate, in response to detecting a connection drop of at least one second mobile device when the at least one second mobile device moves along the road, a drop position of the at least one second mobile device on the basis of attribute information of the at least one second mobile device and the typical speed information; and a determining module 830 configured to determine the coverage hole on the basis of the drop position of the at least one second mobile device.

In one embodiment of the present invention, retrieving module 810 including: a detecting module configured to, with respect to each first mobile device of the at least one first mobile device, detect from the connection history a plurality of handovers made by the each first mobile device between a plurality of base stations along the road; a calculating module configured to calculate historical speed information when the each first mobile device makes the plurality of handovers; and a speed retrieving module configured to retrieve the typical speed information on the basis of the historical speed information.

In one embodiment of the present invention, the calculating module includes: a speed calculating module configured to calculate historical speed information during the plurality of handovers on the basis of handover times and handover positions of two successive handovers among the plurality of handovers.

In one embodiment of the present invention, the speed calculating module includes: an obtaining module configured to, with respect to a handover $Switch_i$ among two successive handovers, obtain a handover position $Pos_i$ and a handover time $Time_i$; and a speed obtaining module configured to calculate a speed $$Vol_i = \frac{Pos_{i+1} - Pos_i}{Time_{i+1} - Time_i}$$

of the each first mobile device on the handover $Switch_i$.

In one embodiment of the present invention, the handover position $Pos_i$ is obtained on the basis of positions of two base stations associated with the handover $Switch_i$ and geographical information of the road.

In one embodiment of the present invention, the handover position $Pos_i$ is an intersection of the road with a perpendicular bisector of a connecting line between the two base stations.

In one embodiment of the present invention, estimating module 820 includes: an attribute information retrieving module configured to, with respect to each second mobile device of the at least one second mobile device, retrieve a drop time $Time_{drop}$ of a connection, a handover time of a latest handover between the plurality of base stations before the drop as well as a handover position Pos of the latest handover from connection history of the each second mobile device; a lookup module configured to look up a speed Vol corresponding to the handover position Pos in the typical speed information; and a position calculating module configured to calculate a drop position $Pos_{drop}$ of the each second mobile device: $Pos_{drop}=Pos+Vol*(Time_{drop}-Time)$.

In one embodiment of the present invention, retrieving module 810 includes: a first speed retrieving module configured to retrieve typical speed information of the at least one first mobile device in a plurality of environmental states, the plurality of environmental states including at least one of: date, time, holiday, and meteorological state.

In one embodiment of the present invention, estimating module 820 further includes: a measuring module configured to measure a current environmental state of the at least one second mobile device; and a first estimating module configured to estimate a drop position of the at least one second mobile device on the basis of the typical speed information corresponding to the current environmental state.

In one embodiment of the present invention, there is further comprised: a direction module configured to respectively execute the apparatus with respect to the at least one first mobile device that moves in different directions of the road.

The present invention can be a system, a method, and/or a computer program product. The computer program product can include a computer readable storage medium or media having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for determining a coverage hole of a communication network along a road, comprising:
retrieving average speed information on the basis of connection history of at least one first mobile device when the at least one first mobile device moves along the road;
estimating, in response to detecting a connection drop of at least one second mobile device when the at least one second mobile device moves along the road, a drop position of the at least one second mobile device on the basis of moving time information of the at least one second mobile device and the average speed information; and
determining the coverage hole on the basis of the drop position of the at least one second mobile device
wherein the estimating, in response to detecting the connection drop of the at least one second mobile device when the at least one second mobile device moves along the road, the drop position of the at least one second mobile device on the basis of the moving time information of the at least one second mobile device and the average speed information comprises: with respect to each second mobile device of the at least one second mobile device,
retrieving a drop time $Time_{drop}$ of a connection, a handover time Time of a latest handover between a plurality of base stations before the connection drop as well as a handover position Pos of the latest handover from connection history of the each second mobile device;
looking up a speed Vo1 corresponding to the handover position $P_{os}$ in the typical speed information; and
calculating a drop position $Pos_{drop}$ of the each second mobile device: $Pos_{drop}=Pos+Vo1*(Time_{drop}-Time)$.

2. The method according to claim 1, wherein the retrieving average speed information on the basis of connection history of the at least one first mobile device when the at least one first mobile device moves along the road comprises:
with respect to each first mobile device of the at least one first mobile device,
detecting from the connection history a plurality of handovers made by the each first mobile device between a plurality of base stations along the road; and
calculating, on the basis of the plurality of handovers, historical speed information when the each first mobile device makes the plurality of handovers; and
retrieving the average speed information on the basis of the historical speed information.

3. The method according to claim 2, wherein the calculating the historical speed information when the each first mobile device makes the plurality of handovers comprises:
calculating historical speed information during the plurality of handovers on the basis of handover times and handover positions of two successive handovers among the plurality of handovers.

4. The method according to claim 3, wherein the calculating the historical speed information during the plurality of handovers on the basis of the handover times and the handover positions of the two successive handovers among the plurality of handovers comprises:
with respect to a handover $Switch_i$ among the two successive handovers, obtaining a handover position $Pos_i$ and a handover time $Time_i$ ;and
calculating a speed $$Vol_i = \frac{Pos_{i+1} - Pos_i}{Time_{i+1} - Time_i}$$

of the each first mobile device on the handover $Switch_i$.

5. The method according to claim 4, wherein the handover position $Pos_i$ is obtained on the basis of positions of two base stations associated with the handover $Switch_i$ and geographical information of the road.

6. The method according to claim 5, wherein the handover position $Pos_i$ is an intersection of the road with a perpendicular bisector of a connecting line between the two base stations.

7. The method according to claim 1, wherein the retrieving the average speed information on the basis of the connection history of the at least one first mobile device when the at least one first mobile device moves along the road comprises:
retrieving the average speed information of the at least one first mobile device in a plurality of environmental states, the plurality of environmental states comprising at least one of: date, time, holiday, and meteorological state.

8. The method according to claim 7, wherein the estimating, in response to detecting a connection drop of the at least one second mobile device when the at least one second mobile device moves along the road, the drop position of the at least one second mobile device on the basis of the moving time information of the at least one second mobile device and the average speed information further comprises:
measuring a current environmental state of the at least one second mobile device; and
estimating the drop position of the at least one second mobile device on the basis of the average speed information corresponding to the current environmental state.

9. The method according to claim 1, further comprising:
respectively executing the method with respect to the at least one first mobile device that moves in different directions of the road.

10. An apparatus for determining a coverage hole of a communication network along a road, comprising:
one or more computer readable storage media;
program instructions stored on the one or more computer readable storage media for execution by at least one of the one or more processors, the program instructions comprising program instructions to:
retrieve average speed information on the basis of connection history of at least one first mobile device when the at least one first mobile device moves along the road;
estimate, in response to detecting a connection drop of at least one second mobile device when the at least one second mobile device moves along the road, a drop position of the at least one second mobile device on the basis of moving time information of the at least one second mobile device and the average speed information; and
determine the coverage hole on the basis of the drop position of the at least one second mobile device;
wherein the estimate includes, with respect to each second mobile device of the at least one second mobile device, retrieving a drop time $Time_{drop}$ of a connection, a handover time of a latest handover between a plurality of base stations before the connection drop as well as a handover position Pos of the latest handover from connection history of the each second mobile device;
looking up a speed Vol corresponding to the handover position $P_{os}$ in the typical speed information; and
calculating a drop position $Pos_{drop}$ of the each second mobile device: $Pos_{drop}=Pos+Vol*(Time_{drop}-Time)$.

11. The apparatus according to claim 10, wherein the program instructions to retrieve comprise:
with respect to each first mobile device of the at least one first mobile device, detecting from the connection history a plurality of handovers made by the each first mobile device between a plurality of base stations along the road;
calculating, on the basis of the plurality of handovers, historical speed information when the each first mobile device makes the plurality of handovers; and
retrieving the average speed information on the basis of the historical speed information.

12. The apparatus according to claim 11, wherein the program instructions to calculate comprise:
calculating historical speed information during the plurality of handovers on the basis of handover times and handover positions of two successive handovers among the plurality of handovers.

13. The apparatus according to claim 12, wherein the program instructions to calculate historical speed information comprise:
with respect to a handover $Switch_i$ among the two successive handovers, obtaining a handover position $Pos_i$ and a handover time $Time_i$; and
calculating a speed $$Vol_i = \frac{Pos_{i+1} - Pos_i}{Time_{i+1} - Time_i}$$

of the each first mobile device on the handover $Switch_i$.

14. The apparatus according to claim 13, wherein the handover position $Pos_i$ is obtained on the basis of positions of two base stations associated with the handover $Switch_i$ and geographical information of the road.

15. The apparatus according to claim 14, wherein the handover position $Pos_i$ is an intersection of the road with a perpendicular bisector of a connecting line between the two base stations.

16. The apparatus according to claim 10, wherein the program instructions to retrieve comprise:

retrieving average speed information of the at least one first mobile device in a plurality of environmental states, the plurality of environmental states comprising at least one of: date, time, holiday, and meteorological state.

17. The apparatus according to claim 16, wherein the program instructions to estimate further comprise:
measuring a current environmental state of the at least one second mobile device; and
estimating the drop position of the at least one second mobile device on the basis of the average speed information corresponding to the current environmental state.

18. The apparatus according to claim 10, further comprising:
respectively execute the apparatus with respect to the at least one first mobile device that moves in different directions of the road.

* * * * *